(12) United States Patent
Fujiwara et al.

(10) Patent No.: US 12,704,486 B2
(45) Date of Patent: Aug. 11, 2026

(54) PUMP UNIT FOR CHROMATOGRAPH

(71) Applicant: SHIMADZU CORPORATION, Kyoto (JP)

(72) Inventors: Masanori Fujiwara, Kyoto (JP); Takafumi Nakamura, Kyoto (JP); Yuki Iijima, Kyoto (JP); Kosuke Wada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 324 days.

(21) Appl. No.: 18/384,843

(22) Filed: Oct. 28, 2023

(65) Prior Publication Data

US 2024/0159717 A1 May 16, 2024

(30) Foreign Application Priority Data

Nov. 10, 2022 (JP) ................................ 2022-180440

(51) Int. Cl.

*G01N 30/32* (2006.01)
*F04B 13/00* (2006.01)
*F04B 53/10* (2006.01)
*G01N 30/02* (2006.01)
*G01N 30/20* (2006.01)

(52) U.S. Cl.

CPC ............ *G01N 30/32* (2013.01); *F04B 13/00* (2013.01); *F04B 53/10* (2013.01); *G01N 30/20* (2013.01); *G01N 2030/027* (2013.01); *G01N 2030/326* (2013.01); *G01N 2030/328* (2013.01)

(58) Field of Classification Search

CPC ............ G01N 30/20; G01N 2030/027; G01N 2030/328

USPC ........................................................ 417/313

See application file for complete search history.

(56) References Cited

U.S. PATENT DOCUMENTS 5,415,489 A 5/1995 Hutchins
6,564,828 B1 * 5/2003 Ishida .................. F16K 15/026 137/515.5
2021/0132009 A1 * 5/2021 Nikko .................... F04B 53/22
2022/0163492 A1 5/2022 Toji

FOREIGN PATENT DOCUMENTS

CN 102597521 A 7/2012
DE 102015224411 A1 * 6/2017 ............ B22D 17/20
JP H02248857 A 10/1990

(Continued)

OTHER PUBLICATIONS

Fehlbier et al., 'Check Valve'—Mach. Trans. DE 102015224411, (Year: 2017).*

(Continued)

*Primary Examiner* — Kenneth J Hansen

(74) *Attorney, Agent, or Firm* — Renner, Otto, Boisselle & Sklar, LLP

(57) ABSTRACT

A pump unit for a chromatograph includes a plunger pump and an upstream check valve. The plunger pump has a pump head and pumps a mobile phase. The upstream check valve is provided upstream of the pump head. The upstream check valve includes a flow-path portion and a temperature regulator. The flow-path portion guides the mobile phase to the plunger pump. The temperature regulator regulates a temperature of the mobile phase passing through the flow-path portion.

10 Claims, 7 Drawing Sheets

(56) References Cited

FOREIGN PATENT DOCUMENTS

| | | | |
|---|---|---|---|
| JP | H06-049871 | U | 7/1994 |
| JP | 2658368 | B2 * | 9/1997 |
| JP | 2017161295 | A | 9/2017 |
| JP | 2022084355 | A | 6/2022 |
| WO | 2011054632 | A2 | 5/2011 |

OTHER PUBLICATIONS

Chinese Office Action corresponding to counterpart China patent application No. 202311461009.8 dated Jun. 30, 2026 with English translation.

Japanese Office Action corresponding to counterpart Japan patent application No. 2022-180440 dated Jun. 30, 2026 with English translation.

* cited by examiner

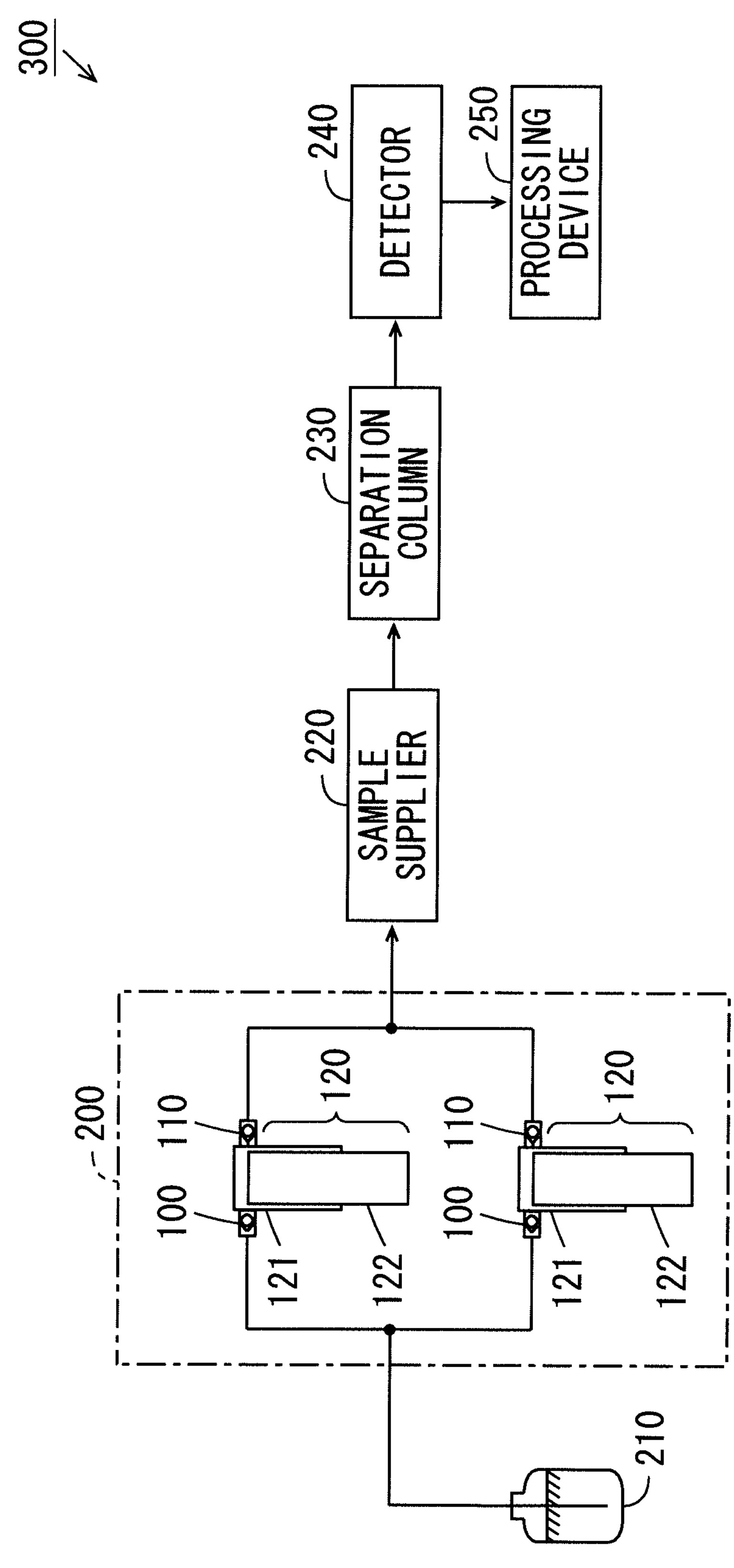
F I G. 1

F I G. 2
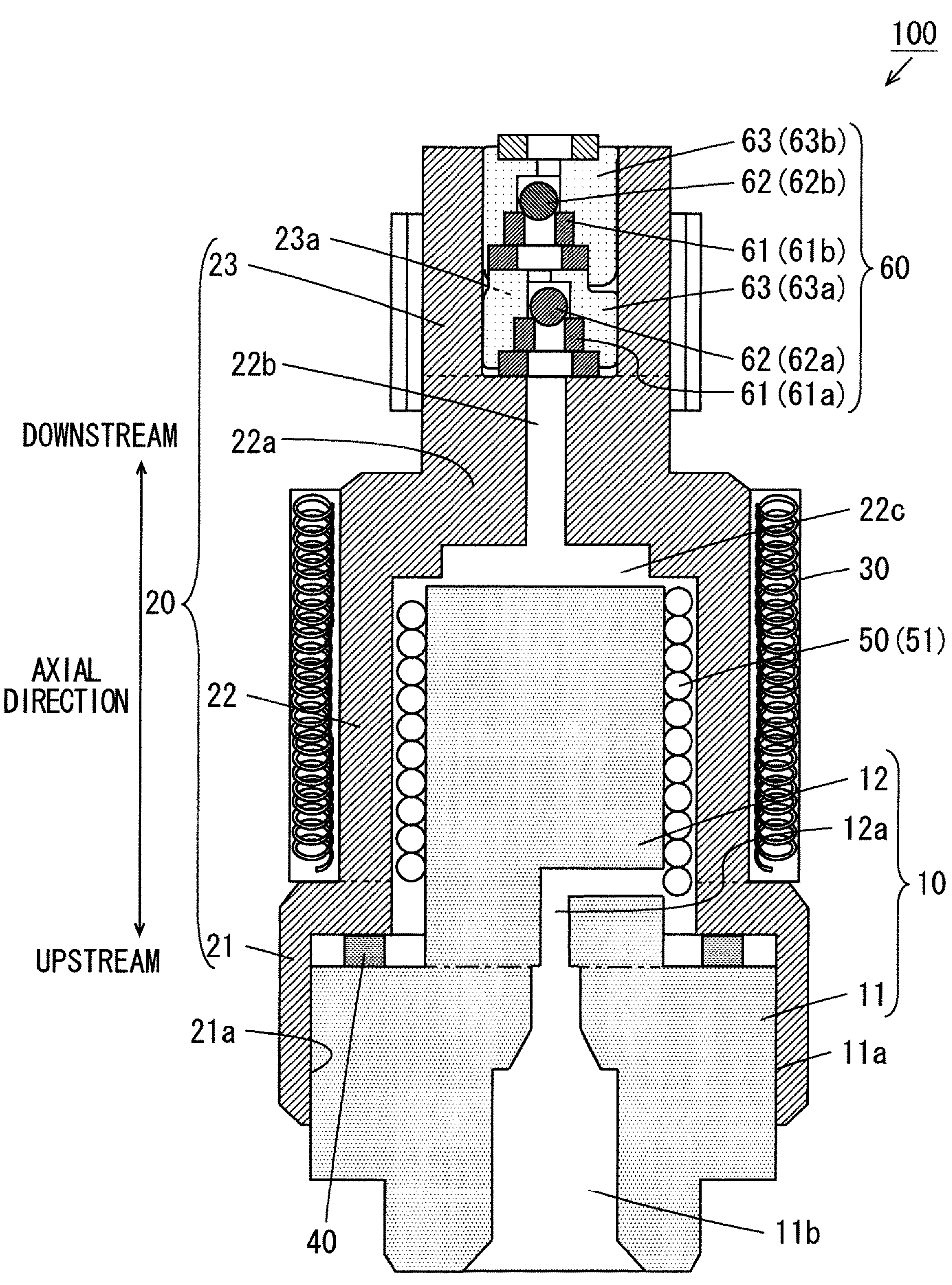

F I G. 4
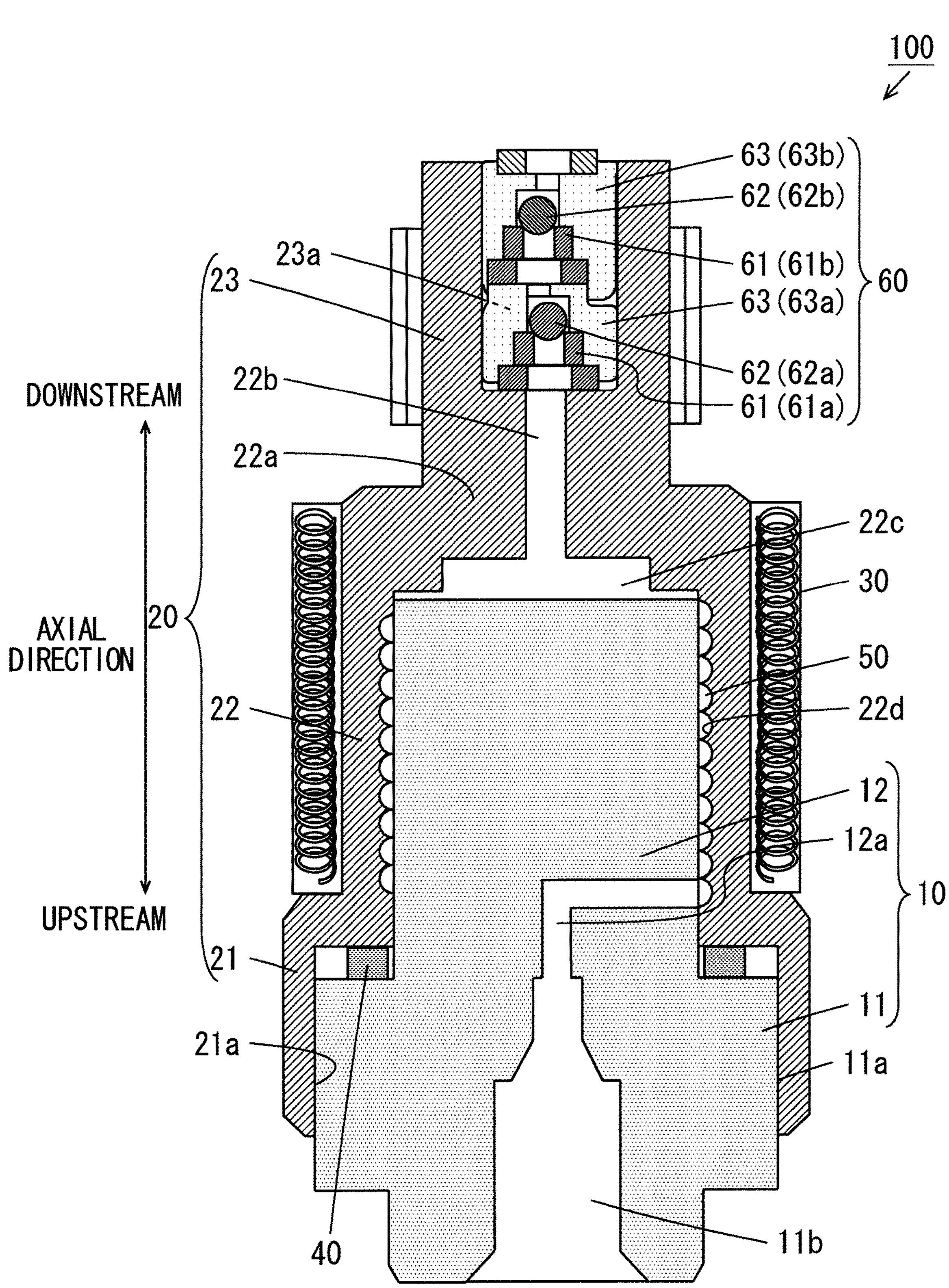

F I G. 5
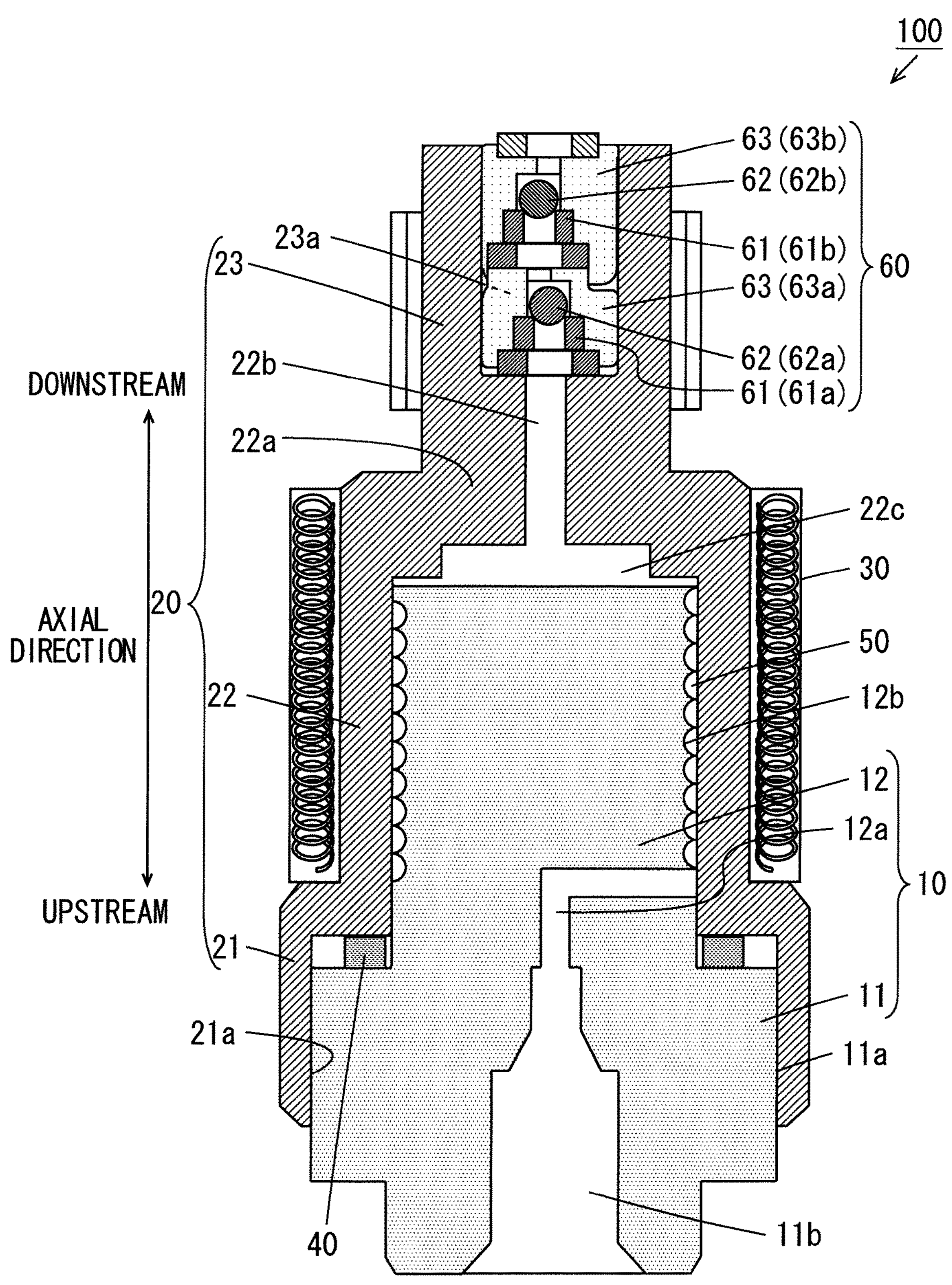

PUMP UNIT FOR CHROMATOGRAPH

BACKGROUND

Technical Field

The present invention relates to a pump unit for a chromatograph.

DESCRIPTION OF RELATED ART

Chromatographs have been known as analysis devices that separate a substance included in a sample into different components. For example, in a liquid chromatograph described in JP 2658368 B2, a mobile phase contained in a reservoir is pumped by a liquid sending pump. A sample is injected into the mobile phase by a sample injector and introduced into a column. The sample that has been introduced into the column is eluted into components based on a difference in chemical property or composition and detected by a detector. A chromatogram is produced by a data processing unit based on a result of detection provided by the detector.

SUMMARY

When the temperature of a mobile phase in the reservoir changes due to a change in ambient temperature, even in a case in which a syringe of a pump is driven at a constant speed, the density of the mobile phase changes. Thus, the flow rate of the mobile phase to be sent changes, and the reproducibility of analysis of a sample is degraded. As such, in JP 2658368 B2, a temperature control mechanism for keeping a mobile phase at a constant temperature lower than room temperature is provided between the reservoir and the liquid sending pump. However, the configuration disclosed in JP 2658368 B2 may not satisfy the reproducibility of analysis of a sample required in recent years.

An object of the present invention is to provide a pump unit, for a chromatograph, capable of improving reproducibility of an analysis.

One aspect of the present invention relates to a pump unit for a chromatograph, including a plunger pump that has a pump head and pumps a mobile phase, and a check valve provided upstream of the pump head, wherein the check valve includes a flow-path portion that guides the mobile phase to the plunger pump, and a temperature regulator that regulates a temperature of the mobile phase passing through the flow-path portion.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 1 is a diagram showing the configuration of a liquid chromatograph including a pump unit according to one embodiment of the present invention;

FIG. 2 is a longitudinal cross sectional view showing the structure of an upstream check valve of FIG. 1;

FIG. 4 is a diagram showing another example of a flow-path portion;

FIG. 5 is a diagram showing yet another example of the flow-path portion;

DETAILED DESCRIPTION

(1) Chromatograph

Figure 3:
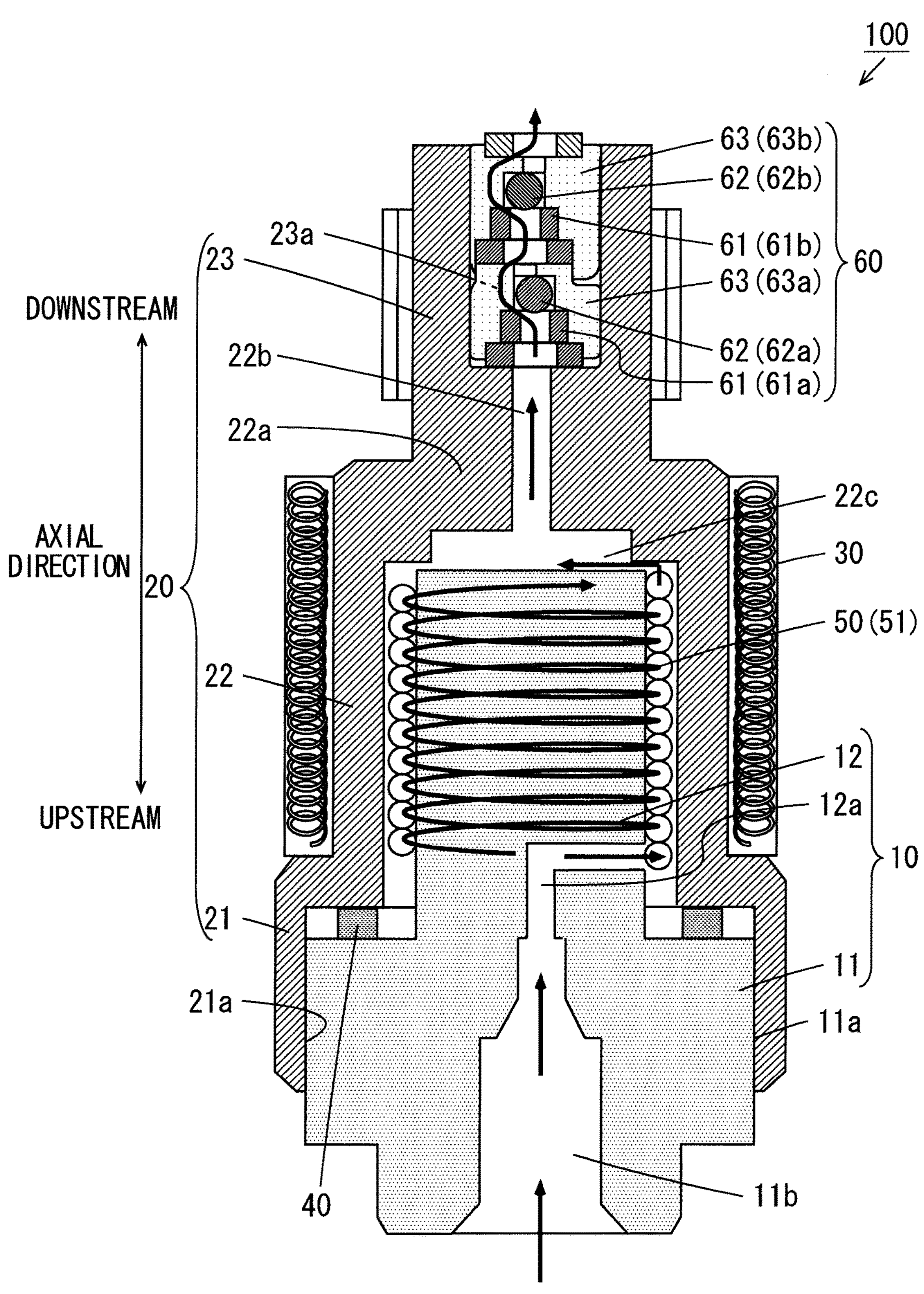
FIG. 3 is a diagram for explaining the operation of the upstream check valve during a sucking operation of a plunger pump of FIG. 1.

A pump unit for a chromatograph according to embodiments of the present invention will be described below with reference to the drawings. FIG. 1 is a diagram showing the configuration of a liquid chromatograph (LC) including the pump unit according to one embodiment of the present invention. As shown in FIG. 1, the LC 300 includes the pump unit 200, a mobile phase container 210, a sample supplier 220, a separation column 230, a detector 240 and a processing device 250.

The mobile phase container 210 stores an aqueous solution or a solvent such as an organic solvent as a mobile phase. In the mobile phase container 210, a mobile phase is kept at an ambient temperature of about 23° C. The LC 300 may include a plurality of mobile phase containers 210 that respectively store a plurality of different solvents. In this case, the LC 300 may further include a mixer that mixes the plurality of mobile phases and supply the mixed mobile phases downstream.

The pump unit 200 includes an upstream check valve 100, a downstream check valve 110 and a plunger pump 120. The plunger pump 120 includes a pump head 121 and a plunger 122. In the present example, the pump unit 200 is configured to have a parallel double plunger system. Therefore, the pump unit 200 includes two sets of the upstream check valve 100, the downstream check valve 110 and the plunger pump 120.

The upstream check valve 100 is provided upstream of the pump head 121 of the corresponding plunger pump 120. The downstream check valve 110 is provided downstream of the pump head 121 of the corresponding plunger pump 120. The two upstream check valves 100 are connected to each other and connected to the mobile phase container 210. Further, the two downstream check valves 110 are connected to each other and also connected to the sample supplier 220.

The plungers 122 of the two plunger pumps 120 reciprocate in opposite phases to each other by a drive mechanism (not shown). Thus, the two plunger pumps 120 are driven complementarily to each other. Therefore, in a period during which one plunger pump 120 performs a discharge operation, the other plunger pump 120 performs a sucking operation. Further, in a period during which the one plunger pump 120 performs a sucking operation, the other plunger pump 120 performs a discharge operation. Thus, the mobile phase stored in the mobile phase container 210 is stably pumped downstream.

The sample supplier 220 is a sample injector, for example, and supplies a sample to be analyzed to the mobile phase pumped by the pump unit 200. The sample supplied by the sample supplier 220 is mixed with the mobile phase and introduced into the separation column 230. The separation column 230 is contained in a column oven (not shown) and regulated to have a predetermined constant temperature. The separation column 230 separates the introduced sample into components according to differences in chemical property or composition.

The detector 240 is a UV (ultraviolet-visible spectroscopy) detector, an absorbance detector or an RI (differential refractive index) detector, for example. The detector 240 detects the components into which the sample is separated by the separation column 230 and outputs a detection signal indicating a detection intensity to the processing device 250.

The processing device 250 includes a CPU and a memory, for example, and controls the operations of the pump unit 200, the sample supplier 220, the separation column 230 (column oven) and the detector 240. Further, the processing device 250 processes the detection signal provided by the detector 240 to produce a liquid chromatogram representing the relationship between the retention time of each component into which the sample is separated by the separation column 230 and the detection intensity.

(2) Structure of Upstream Check Valve

A mobile phase supplied from the mobile phase container 210 is introduced into the upstream check valve 100 from the upstream end portion of the upstream check valve 100, and is led out to the pump head 121 of the corresponding plunger pump 120 from the downstream end portion of the upstream check valve 100. The structure of the upstream check valve 100 will be described below. Because the structure of the downstream check valve 110 is well known, its description is not described here.

FIG. 2 is a longitudinal cross sectional view showing the structure of the upstream check valve 100 of FIG. 1. As shown in FIG. 2, the upstream check valve 100 has a shape extending from an upstream position to a downstream position. Hereinafter, the direction in which the upstream check valve 100 extends is referred to as an axial direction. The upstream check valve 100 includes a plug 10, a housing 20, a temperature regulator 30, a seal member 40, a flow-path portion 50 and a valve unit 60.

The plug 10 is formed of a material having low thermal conductivity and high corrosion resistance, for example. In the present example, the plug 10 is formed of fluororesin (polytetrafluoroethylene, for example). The plug 10 includes a screw portion 11 and a projecting portion 12. In FIG. 2, the boundary between the screw portion 11 and the projecting portion 12 is indicated by the one-dot and dash line for convenience.

The screw portion 11 is a male screw and has a columnar shape. A screw 11*a* is formed on the outer peripheral surface of the screw portion 11. A through hole 11*b* extending in the axial direction is formed in the screw portion 11. A flow path extending from the mobile phase container 210 is attached to the through hole 11*b* by a ferrule, for example. The projecting portion 12 has a columnar shape having a diameter smaller than that of the screw portion 11, and projects in the axial direction from the downstream end surface of the screw portion 11. A through hole 12*a* connecting between the upstream end surface and the outer peripheral surface of the projecting portion 12 is formed in the projecting portion 12. The through hole 11*b* of the screw portion 11 and the through hole 12*a* of the projecting portion 12 communicate with each other.

The housing 20 is formed of a material having high thermal conductivity and high corrosion resistance, for example. In the present example, the housing 20 is formed of metal such as stainless steel or aluminum. The housing 20 includes a screw portion 21, a flow-path container 22 and a valve container 23. In FIG. 2, the boundaries among the screw portion 21, the flow-path container 22 and the valve container 23 are indicated by the dotted lines for convenience.

The screw portion 21 is a female screw and has an annular shape. A screw 21*a* is formed on the inner peripheral surface of the screw portion 21. The flow-path container 22 has a cylindrical shape having a diameter smaller than that of the screw portion 21, and projects in the axial direction from the downstream end surface of the screw portion 21. The downstream end portion of the flow-path container 22 is closed by a bottom surface member 22*a*. Further, in the present example, the center portion of the downstream end surface of the bottom surface member 22*a* projects in the axial direction. A through hole 22*b* extending in the axial direction is formed in a bottom surface member 22*a*.

The valve container 23 has a cylindrical shape having a diameter smaller than that of the flow-path container 22. In the present example, the valve container 23 has substantially the same diameter as that of the projecting portion of the bottom surface member 22*a*, and is provided so as to extend in the axial direction from the downstream end surface of the bottom surface member 22*a*. An inner space 22*c* of the flow-path container 22 and an inner space 23*a* of the valve container 23 communicate with each other through the through hole 22*b* of the bottom surface member 22*a*.

The temperature regulator 30 is an electric resistor such as a heating wire, and is attached to the outer peripheral surface of the flow-path container 22 of the housing 20. The temperature regulator 30 may be a temperature regulating element such as a Peltier element. The seal member 40 is an O-ring, for example, and is arranged at the downstream end surface of the screw portion 11 so as to surround the projecting portion 12 of the plug 10.

In the present embodiment, the flow-path portion 50 is a pipe 51 formed of metal, for example. The pipe 51 may be formed of the similar material as that of the housing 20, or may be formed of another material. The pipe 51 is wound around the outer peripheral surface of the projecting portion 12 of the plug 10. The upstream end portion of the pipe 51 is connected to the through hole 12*a* that opens at the outer peripheral surface of the projecting portion 12. The downstream end portion of the pipe 51 is fixed in the vicinity of the downstream end surface of the projecting portion 12.

The plug 10 is rotated with respect to the housing 20 while being inserted into the housing 20 from an upstream position. In this case, the screw 11*a* of the screw portion 11 of the plug 10 and the screw 21*a* of the screw portion 21 of the housing 20 are engaged with each other. Thus, the plug 10 and the housing 20 are fixed to each other with the projecting portion 12 of the plug 10 located in the flow-path container 22 of the housing 20. Therefore, the pipe 51 wound around the outer peripheral surface of the projecting portion 12 is contained in the flow-path container 22. The gap between the plug 10 and the housing 20 is sealed by the seal member 40.

The valve unit 60 includes a valve seat 61, a valve element 62 and a restricting member 63, and is contained in the valve container 23 of the housing 20. In the present example, the valve unit 60 includes two sets of the valve seat 61, the valve element 62 and the restricting member 63. In the following description, the valve seat 61, the valve element 62 and the restricting member 63 of one set are referred to as a valve seat 61*a*, a valve element 62*a* and a restricting member 63*a*, respectively. Further, the valve seat 61, the valve element 62 and the restricting member 63 of the other set are referred to as a valve seat 61*b*, a valve element 62*b* and a restricting member 63*b*, respectively.

The valve seat 61*a* has a substantially cylindrical shape, for example, and is attached to the downstream end surface of the bottom surface member 22*a* so as to surround the through hole 22*b* of the bottom surface member 22*a* of the flow-path container 22. The valve element 62*a* has a spherical shape, for example, and is arranged downstream of the valve seat 61*a*. The valve element 62*a* is configured to be capable of being seated on the downstream end surface of the valve seat 61*a* and capable of being separated from the downstream end surface of the valve seat 61*a* by moving in the axial direction. The restricting member 63*a* has a substantially cylindrical shape, for example, and is arranged so as to surround the valve seat 61*a* and the valve element 62*a*. The restricting member 63*a* restricts the movement of the valve element 62*a* in directions other than the axial direction and the amount of movement in the axial direction.

The valve seat 61*b* has a substantially cylindrical shape, for example, and is attached to the downstream end surface of the restricting member 63*a*. The valve element 62*b* has a spherical shape, for example, and is arranged downstream of the valve seat 61*b*. The valve element 62*b* is configured to be capable of being seated on the downstream end surface of the valve seat 61*b* and capable of being separated from the downstream end surface of the valve seat 61*b* by moving in the axial direction. The restricting member 63*b* has a substantially cylindrical shape, for example, and is arranged so as to surround the valve seat 61*b* and the valve element 62*b*. The restricting member 63*b* restricts the movement of the valve element 62*b* in directions other than the axial direction and the amount of movement in the axial direction.

(3) Operation of Upstream Check Valve

FIG. 3 is a diagram for explaining the operation of the upstream check valve 100 during a sucking operation of the plunger pump 120 of FIG. 1. In FIG. 3, a flow of a mobile phase during the sucking operation of the plunger pump 120 is indicated by the thick arrows. As shown in FIG. 3, the valve elements 62*a*, 62*b* are separated from the valve seats 61*a*, 61*b*, respectively, in a period during which the plunger pump 120 performs the sucking operation, that is, a period during which the pressure in the pump chamber of the pump head 121 is negative. In this case, the space between the valve seat 61*a* and the valve element 62*a* and the space between the valve seat 61*b* and the valve element 62*b* are opened.

In this period, the mobile phase contained in the mobile phase container 210 of FIG. 1 is introduced into the plug 10 from the through hole 11*b* of the screw portion 11 through a predetermined flow path. The mobile phase introduced into the plug 10 is introduced into the flow-path portion 50 (the pipe 51 in the present example) from the upstream end portion of the flow-path portion 50 through the through hole 12*a* of the projecting portion 12. The mobile phase introduced into the flow-path portion 50 is guided to the downstream end portion of the flow-path portion 50 through the spiral flow-path portion 50.

The temperature regulator 30 is provided at the outer peripheral surface of the flow-path container 22. Further, the housing 20 has high thermal conductivity. Therefore, the heat generated by the temperature regulator 30 is transmitted to the flow-path portion 50 through the flow-path container 22. The thickness of the flow-path container 22 may be reduced in a range in which sufficient heat can be transmitted to the flow-path portion 50 in a short period of time and sufficient pressure resistance is provided. The mobile phase is regulated to have a predetermined constant temperature in a period during which the mobile phase flows through the flow-path portion 50 by the heat transmitted from the flow-path container 22. In the present example, the mobile phase flowing through the flow-path portion 50 is heated to about 30° C. or about 40° C. by the temperature regulator 30.

The mobile phase the temperature of which is regulated is led out from the downstream end portion of the flow-path portion 50 to the inner space 22*c* of the flow-path container 22. When the plug 10 and the housing 20 are fixed to each other, the seal member 40 is crushed by a predetermined thickness by the screw portion 11 and the screw portion 21. Therefore, the gap between the screw portion 11 and the screw portion 21 is sealed. Therefore, the mobile phase led out to the inner space 22*c* of the flow-path container 22 is prevented from leaking out from the gap between the screw portion 11 and the screw portion 21.

The mobile phase led out to the inner space 22*c* of the flow-path container 22 is introduced into the inner space 23*a* of the valve container 23 through the through hole 22*b* of the bottom surface member 22*a*. The mobile phase introduced into the inner space 23*a* of the valve container 23 sequentially passes between the valve seat 61*a* and the valve element 62*a* and between the valve seat 61*b* and the valve element 62*b*, and is led out from the downstream end portion of the valve container 23. Thus, the mobile phase is sucked into the pump chamber of the pump head 121.

On the other hand, in a period during which the plunger pump 120 performs a discharge operation, that is, a period during which the pressure in the pump chamber of the pump head 121 is positive, the valve elements 62*a*, 62*b* are seated on the valve seats 61*a*, 61*b*, respectively. In this case, the space between the valve seat 61*a* and the valve element 62*a* and the space between the valve seat 61*b* and the valve element 62*b* are closed. This prevents a backflow of the mobile phase from a downstream position to an upstream position.

(4) Effects

In the pump unit 200 according to the present embodiment, during a sucking operation of the plunger pump 120, a mobile phase is introduced into the pump head 121 of the plunger pump 120 through the flow-path portion 50 of the upstream check valve 100. The temperature of the mobile phase is regulated by the temperature regulator 30 in a period during which the mobile phase flows through the flow-path portion 50. In this manner, because the temperature of the mobile phase is regulated in the immediate vicinity of a position upstream of the pump head 121, the mobile phase having a constant density is introduced into the pump head 121. Thus, the amount of the mobile phase pumped by the plunger pump 120 during the discharge operation is constant. As a result, the reproducibility of analysis can be improved.

In the present example, because the flow-path portion 50 has a spiral shape, it is possible to increase the length of the flow path of the flow-path portion 50 without increasing the size of the upstream check valve 100 in the axial direction. Therefore, the temperature of the mobile phase flowing through the flow-path portion 50 can be sufficiently regulated by the temperature regulator 30. Further, the flow-path portion 50 includes the pipe 51 wound around the plug 10. In this case, the flow-path portion 50 can be easily realized.

The flow-path portion 50 is contained in the inner space 22*c* of the flow-path container 22 of the housing 20, and the temperature regulator 30 is attached to the outer surface of the flow-path container 22. In this case, the temperature of the mobile phase flowing through the flow-path portion 50 can be regulated by the temperature regulator 30 with a simple configuration. The projecting portion 12 of the plug 10 fills the inner space 22*c* of the flow-path container 22, and the through holes 11*b*, 12*a* connected to the flow-path portion 50 are formed in the screw portion 11 and the projecting portion 12 of the plug 10, respectively. Thus, it is possible to easily supply the mobile phase to the flow-path portion 50 in the housing 20 while containing the flow-path portion 50 in the flow-path container 22.

The plug 10 may be formed of a material having thermal conductivity lower than that of the housing 20. For example, the plug 10 may be formed of a fluororesin. In this case, the heat generated by the temperature regulator 30 is prevented from being dissipated through the plug 10. Thus, it is possible to more efficiently regulate the temperature of the mobile phase flowing through the flow-path portion 50.

(5) Other Embodiments (a) While the flow-path portion 50 includes the pipe 51 in the above-mentioned embodiment, the embodiment is not limited to this. FIG. 4 is a diagram showing another example of the flow-path portion 50. As shown in FIG. 4, in the present example, the inner peripheral surface of the flow-path container 22 of the housing 20 and the outer peripheral surface of the projecting portion 12 of the plug 10 come into contact with each other. Further, a groove 22*d* extending in the axial direction while circling is formed in the inner peripheral surface of the flow-path container 22. The groove 22*d* may be a screw groove. In this case, the groove 22*d* which is a space formed between the inner peripheral surface of the flow-path container 22 and the outer peripheral surface of the projecting portion 12 is used as the flow-path portion 50. FIG. 5 is a diagram showing yet another example of the flow-path portion 50.

As shown in FIG. 5, in the present example, the inner peripheral surface of the flow-path container 22 of the housing 20 and the outer peripheral surface of the projecting portion 12 of the plug 10 are in contact with each other. Further, a groove 12*b* extending in the axial direction while circling is formed in the outer peripheral surface of the projecting portion 12. The groove 12*b* may be a screw groove. In this case, the groove 12*b* which is a space formed between the inner peripheral surface of the flow-path container 22 and the outer peripheral surface of the projecting portion 12 is used as the flow-path portion 50. In the examples of FIG. 4 or 5, it is possible to realize the flow-path portion 50 while suppressing an increase in number of components of the upstream check valve 100.

(b) While the flow-path portion 50 has a spiral shape in the above-mentioned embodiment, the embodiment is not limited to this. In a case in which it is not necessary to increase the length of the flow path of the flow-path portion 50, or a case in which the size of the upstream check valve 100 may be increased in the axial direction, the flow-path portion 50 may have another shape such as a linear shape. Therefore, the flow-path portion 50 may be provided so as to penetrate the screw portion 11 and the projecting portion 12 of the plug 10 in the axial direction.

(c) While the plug 10 is formed of a material having thermal conductivity lower than that of the housing 20 in the above-mentioned embodiment, the embodiment is not limited to this. In a case in which the temperature of a mobile phase flowing through the flow-path portion 50 can be sufficiently regulated by the temperature regulator 30, the plug 10 does not have to be formed of a material having thermal conductivity lower than that of the housing 20. For example, the plug 10 may be formed of a material having thermal conductivity similar to that of the housing 20. Alternatively, the plug 10 may be formed of the same material as that of the housing 20. In this case, the plug 10 and the housing 20 may be integrally formed.

(d) While the seal member 40 is provided between the plug 10 and the housing in the above-mentioned embodiment, the embodiment is not limited to this. In a case in which the adhesion between the plug 10 and the housing 20 is high, the seal member 40 does not have to be provided between the plug 10 and the housing 20.

(e) While the pump unit 200 is configured to have a parallel double plunger system in the above-mentioned embodiment, the embodiment is not limited to this. The pump unit 200 may be configured to be have a linear double plunger system. Alternatively, the pump unit 200 may be configured to have a single plunger type. In this case, the pump unit 200 includes a set of the upstream check valve 100, the downstream check valve 110 and the plunger pump 120.

(f) While the valve unit 60 includes two sets of the valve seat 61, the valve element 62 and the restricting member 63 in the above-mentioned embodiment, the embodiment is not limited to this. In a case in which a backflow of a mobile phase can be sufficiently prevented, the valve unit 60 may include one set of the valve seat 61, the valve element 62 and the restricting member 63. On the other hand, in a case in which the upstream check valve 100 is configured to be switchable between an open state and a close state with high accuracy, the valve unit 60 may include three or more sets of the valve seat 61, the valve element 62 and the restricting member 63.

(6) Inventive Example and Comparative Example

In an inventive example described below, the pump unit 200 including the upstream check valve 100 of FIG. 2 was used to produce a liquid chromatogram of a sample. Further, in a comparative example, a pump unit including an upstream check valve not having a temperature regulator was used to produce a liquid chromatogram of the same sample as that of the inventive example.

Figure 6:
FIG. 6 is a diagram showing a liquid chromatogram produced in an inventive example.
Figure 6:
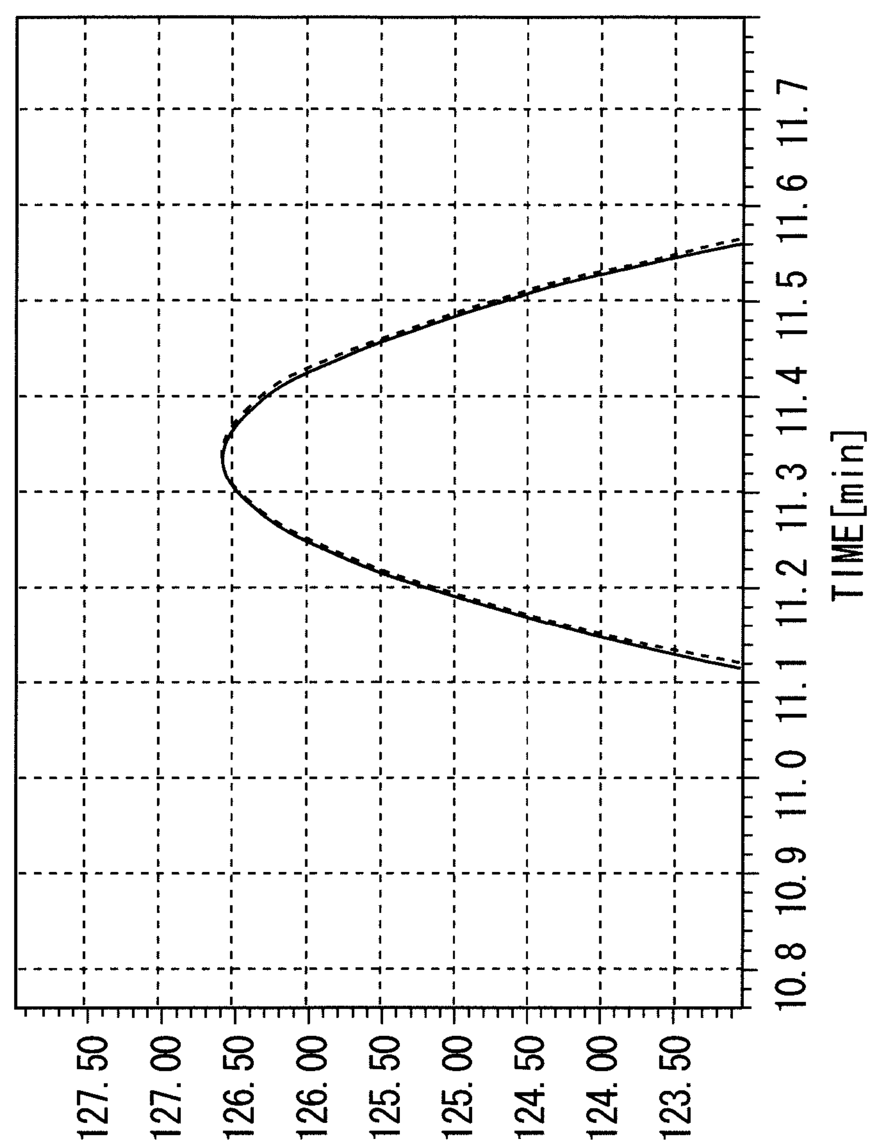
Figure 7:
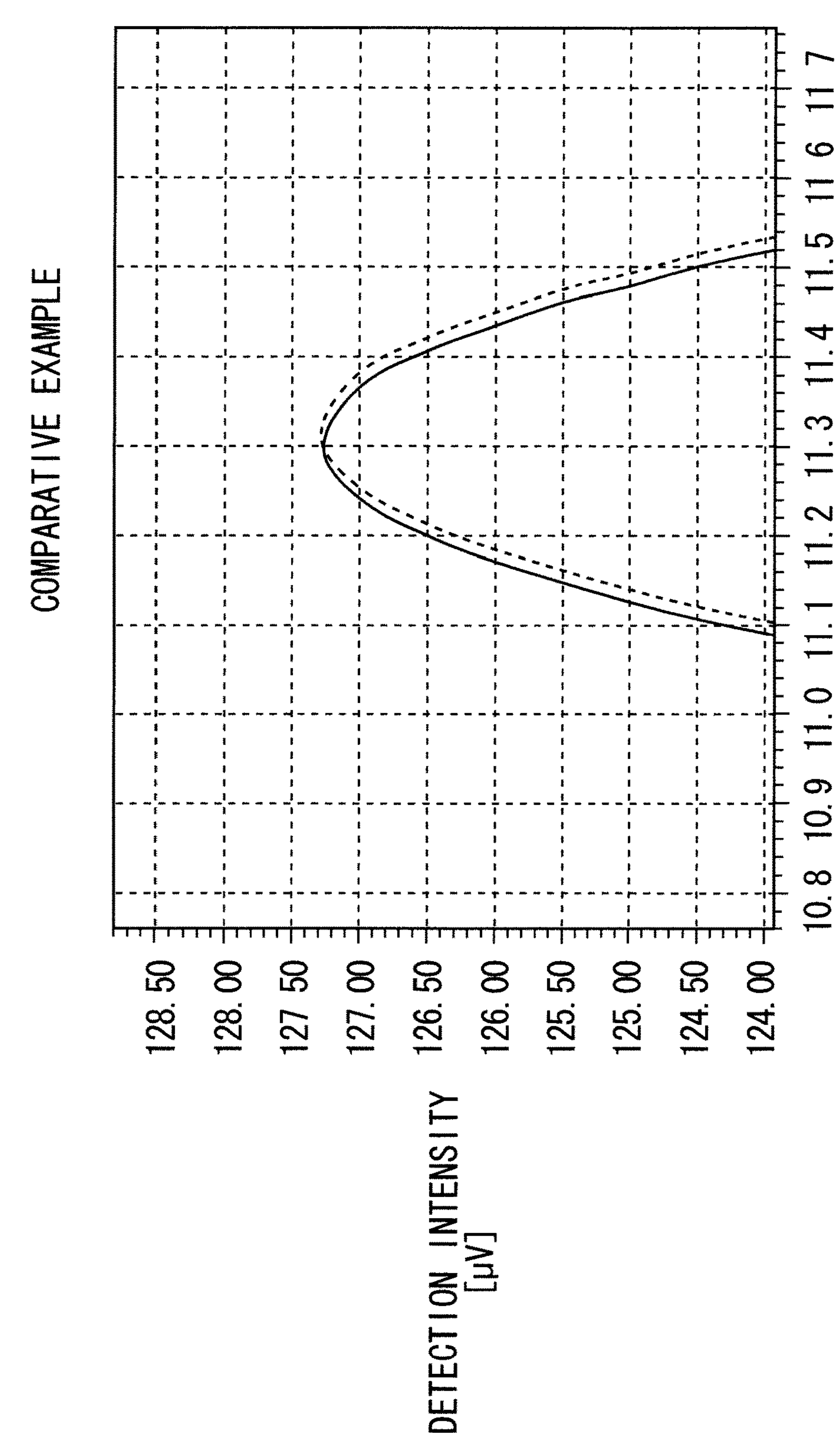
FIG. 7 is a diagram showing a liquid chromatogram produced in a comparative example.

FIG. 6 is a diagram showing a liquid chromatogram produced in an inventive example. FIG. 7 is a diagram showing a liquid chromatogram produced in a comparative example. In each of FIGS. 6 and 7, the abscissa represents a retention time, and the ordinate represents a detected intensity of the sample. Further, the peak of the detection intensity detected for the component of the predetermined sample in the environment of the room temperature of 28° C. is indicated by the solid line. The peak of the detection intensity detected for the same component in the environment of room temperature 32° C. is indicated by the dotted line.

In the inventive example, as shown in FIG. 6, when the room temperature was changed from 28° C. to 32° C., the peak was changed by 0.004 minutes. On the other hand, in the comparative example, as shown in FIG. 7, when the room temperature was changed from 28° C. to 32° C., the peak was changed by 0.014 minutes. As a result, it was confirmed that, in the upstream check valve 100, the change of the peak was suppressed to about ⅓ when the temperature of the mobile phase flowing through the flow-path portion 50 was regulated by the temperature regulator 30.

(7) Aspects

It is understood by those skilled in the art that the plurality of above-mentioned illustrative embodiments are specific examples of the below-mentioned aspects.

(Item 1) A pump unit for a chromatograph according to one aspect may include a plunger pump that has a pump head and pumps a mobile phase, and a check valve provided upstream of the pump head, wherein the check valve includes a flow-path portion that guides the mobile phase to the plunger pump, and a temperature regulator that regulates a temperature of the mobile phase passing through the flow-path portion.

In this pump unit for a chromatograph, the mobile phase is introduced into the pump head of the plunger pump through the flow-path portion of the check valve during a sucking operation of the plunger pump. The temperature of the mobile phase is regulated by the temperature regulator in a period during which the mobile phase flows through the flow-path portion. In this manner, because the temperature of the mobile phase is regulated in the immediate vicinity of a position upstream of the pump head, the mobile phase having a constant density is introduced into the pump head. Thus, an amount of the mobile phase pumped by the plunger pump during the discharge operation is constant. As a result, the reproducibility of analysis can be improved.

(Item 2) The pump unit for a chromatograph according to item 1, wherein the flow-path portion may have a spiral shape.

In this case, the length of the flow path can be increased. Thus, the temperature of the mobile phase flowing through the flow-path portion can be sufficiently regulated by the temperature regulator.

(Item 3) The pump unit for a chromatograph according to item 1 or 2, wherein the check valve may further include a housing that has an inner space and contains the flow-path portion in the inner space, and the temperature regulator may be attached to an outer surface of the housing.

In this case, the temperature of the mobile phase flowing through the flow-path portion can be regulated by the temperature regulator with a simple configuration.

(Item 4) The pump unit for a chromatograph according to item 3, wherein the check valve may further include a plug that has a through hole connected to the flow-path portion and fills the inner space of the housing.

In this case, it is possible to easily supply the mobile phase to the flow-path portion in the housing while containing the flow-path portion in the housing.

(Item 5) The pump unit for a chromatograph according to item 4, wherein the flow-path portion may include a pipe attached to the plug.

In this case, the flow-path portion can be easily realized.

(Item 6) The pump unit for a chromatograph according to item 4, wherein an inner surface of the housing and an outer surface of the plug may come into contact with each other, and a groove that is used as the flow-path portion may be formed in the inner surface of the housing.

In this case, it is possible to realize the flow-path portion while suppressing an increase in number of components of the check valve.

(Item 7) The pump unit for a chromatograph according to item 4, wherein an inner surface of the housing and an outer surface of the plug may come into contact with each other, and a groove that is used as the flow-path portion may be formed in the outer surface of the plug.

In this case, it is possible to realize the flow-path portion while suppressing an increase in number of components of the check valve.

(Item 8) The pump unit for a chromatograph according to any one of items 4 to 7, wherein the plug may be formed of a material having thermal conductivity lower than that of the housing.

In this case, the heat generated by the temperature regulator is prevented from being dissipated through the plug. Thus, the temperature of the mobile phase flowing through the flow-path portion can be efficiently regulated.

(Item 9) The pump unit for a chromatograph according to any one of items 4 to 8, wherein the plug may be formed of a fluororesin.

In this case, the thermal conductivity of the plug can be lowered. Therefore, the heat generated by the temperature regulator is prevented from being dissipated through the plug. Thus, the temperature of the mobile phase flowing through the flow-path portion can be efficiently regulated.

(Item 10) The pump unit for a chromatograph according to any one of items 4 to 9, wherein the check valve may further include a seal member provided between the housing and the plug.

In this case, leakage of the mobile phase from the gap between the housing and the plug can be prevented with a simple configuration.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A pump unit for a chromatograph, comprising:

a plunger pump that has a pump head and pumps a mobile phase; and a check valve provided upstream of the pump head, wherein the check valve includes a housing, a flow-path portion that is provided in the housing and guides the mobile phase to the plunger pump, and a temperature regulator that regulates a temperature of the mobile phase passing through the flow-path portion and causes the mobile phase having a constant density to be introduced into the pump head by heating the housing.

2. The pump unit for a chromatograph according to claim 1, wherein the flow-path portion has a spiral shape.

3. The pump unit for a chromatograph according to claim 1, wherein the housing has an inner space and contains the flow-path portion in the inner space, and the temperature regulator is attached to an outer surface of the housing.

4. The pump unit for a chromatograph according to claim 3, wherein the check valve further includes a plug that has a through hole connected to the flow-path portion and fills the inner space of the housing.

5. The pump unit for a chromatograph according to claim 4, wherein the flow-path portion includes a pipe attached to the plug.

6. The pump unit for a chromatograph according to claim 4, wherein an inner surface of the housing and an outer surface of the plug come into contact with each other, and a groove that is used as the flow-path portion is formed in the inner surface of the housing.

7. The pump unit for a chromatograph according to claim 4, wherein an inner surface of the housing and an outer surface of the plug come into contact with each other, and a groove that is used as the flow-path portion is formed in the outer surface of the plug.

8. The pump unit for a chromatograph according to claim 4, wherein the plug is formed of a fluororesin.

9. The pump unit for a chromatograph according to claim 4, wherein the check valve further includes a seal member provided between the housing and the plug.

10. A pump unit for a chromatograph, comprising:

a plunger pump that has a pump head and pumps a mobile phase; and a check valve provided upstream of the pump head, wherein the check valve includes a flow-path portion that guides the mobile phase to the plunger pump, a temperature regulator that regulates a temperature of the mobile phase passing through the flow-path portion, a housing that has an inner space and contains the flow-path portion in the inner space, and a plug that has a through hole connected to the flow-path portion and fills the inner space of the housing, the temperature regulator is attached to an outer surface of the housing, and the plug is formed of a material having thermal conductivity lower than that of the housing.

* * * * *